United States Patent [19]

Weghaupt

[11] 4,380,356
[45] Apr. 19, 1983

[54] GENERATOR ROTOR, ESPECIALLY TURBO-GENERATOR ROTOR WITH SUPERCONDUCTING FIELD WINDING

[75] Inventor: Erich Weghaupt, Mülheim, Fed. Rep. of Germany

[73] Assignee: Kraftwerk Union Aktiengesellschaft, Mülheim, Fed. Rep. of Germany

[21] Appl. No.: 265,650

[22] Filed: May 20, 1981

[30] Foreign Application Priority Data

May 23, 1980 [DE] Fed. Rep. of Germany ....... 3019864

[51] Int. Cl.³ .............................................. F16C 33/74
[52] U.S. Cl. ...................................... 384/133; 277/80
[58] Field of Search ................... 308/36.3, 36.4, 187.1, 308/187.2, 36.1; 277/80, 135

[56] References Cited

U.S. PATENT DOCUMENTS

| 3,834,775 | 9/1974 | Tuffias ............................... 308/36.3 |
| 4,304,411 | 12/1981 | Wilcock ................................. 277/80 |
| 4,323,801 | 4/1982 | Weghaupt .............................. 310/52 |

FOREIGN PATENT DOCUMENTS 653470  3/1979  U.S.S.R. .............................. 277/80

Primary Examiner—Lenard A. Footland
Attorney, Agent, or Firm—Herbert L. Lerner; Laurence A. Greenberg

[57] ABSTRACT

Generator rotor, including an inner and an outer concentric rotor part having a non-drive side and enclosing a high vacuum space, a first and a second bearing disposed on the non-drive side, a hollow shaft end of the outer rotor part being supported in the first bearing, a journal of the inner rotor part being extended through the hollow shaft end and separately supported in the second bearing, a high-vacuum contactless liquid seal disposed between the hollow shaft end and the journal and having a sealing gap formed therebetween, a co-rotating sealing-liquid reservoir connected to the liquid seal, and magnetic field means for holding magnetic sealing liquid in the sealing gap.

8 Claims, 3 Drawing Figures

GENERATOR ROTOR, ESPECIALLY TURBO-GENERATOR ROTOR WITH SUPERCONDUCTING FIELD WINDING

The invention relates to a generator rotor, especially a turbogenerator rotor with a superconducting field winding and two concentric rotor parts enclosing a high-vacuum space, wherein on the non-drive side, a hollow shaft end of the outer rotor part is supported in a first bearing and a journal of the inner rotor part, which is brought through the hollow shaft end, is separately supported in a second bearing, and a high-vacuum seal is disposed betwen the hollow shaft end and the journal.

A similar generator rotor is already known from Swiss Pat. No. 552,907. However, in that device the hollow shaft end of the outer rotor part and the journal of the inner rotor part are not supported separately, but rather in a common bearing. For sealing the high-vacuum space against the outer atmosphere, sealing bellows are provided in the known generator rotor. The bellows are arranged between the inner circumference of the hollow shaft end and the outer circumference of the journal. These sealing bellows, however, are only accessible with great difficulty and the dual bearing must be disassembled every time for inspection and maintenance.

In U.S. pat. application Ser. No. 147,153 filed May 6, 1980, now U.S. Pat. No. 4,323,801 a generator rotor of the hereinafore-mentioned type was proposed in which the hollow shaft end of the outer rotor part and the journal of the inner rotor part are supported separately, the high-vacuum seal being disposed between the two bearings. This division into two separate bearings allows good accessibility of the high-vacuum seal so that disassembly of the bearing is no longer necessary for inspection and maintenance.

Besides good accessibility, the high-vacuum seals of such generator rotors must meet the following additional requirements:

(a) Between the warm condition and the cold condition of the generator rotor, axial displacements of, for instance, 20 to 25 mm which occur due to thermal dilatation, must be taken up by the high-vacuum seal.

(b) In normal operation, the high-vacuum seal must take up small torsional vibrations between the hollow shaft end and the journal; under special operating conditions, tangential torsion which lies in the millimeter range can occur due to short-circuit torques.

(c) The high-vacuum seal must be able to take up high-frequency radial vibrations between the hollow shaft end and the journal, having an amplitude of, for instance 10 to 20 $\mu M$ in normal operation; this amplitude can increase for short periods when resonance positions are traversed.

(d) The high-vacuum seal must additionally be able to take up high-frequency radial stresses which can result from changes in the bearing alignment in the horizontal and/or vertical direction, with corresponding eccentric positions of the hollow shaft end and the journal.

(e) Because the diameter of the high-vacuum seal is large, at least 500 to 60 mm, due to construction requirements, the high-vacuum seal must be constructed in such a way that it can take up the relatively high centrifugal stresses.

(f) The high-vacuum seal is expected to have a long service life and good maintainability, i.e. it must ensure an uninterrupted operating time of the generator of at least 20,000 to 25,000 hours and, if so indicated by inspection, it must be exchangeable with little installation effort.

The known sealing elements cannot meet these requirements for a high-vacuum seal. In the case of the high static and dynamic stresses, sealing elements such as metal bellows, diaphragm discs and the like are destroyed within a very short time, i.e. they only reach a fraction of the specified operating times.

It is accordingly an object of the invention to provide a generator especially a turbo-generator rotor with a superconducting field winding, which overcomes hereinafore-mentioned disadvantages of the heretofore-known devices of this general type, and in which the high-vacuum seal meets all the above-mentioned requirements.

With the foregoing and other objects in view there is provided, in accordance with the invention, a generator rotor, especially a turbo-generator rotor with a superconducting field winding, comprising an inner and an outer concentric rotor part having a non-drive side and enclosing a high-vacuum space, a first and a second bearing disposed on the non-drive side, a hollow shaft end of the outer rotor part being supported in the first bearing, a journal of the inner rotor part being extended through the hollow shaft end and separately supported in the second bearing, a high-vacuum contactless liquid seal disposed between the hollow shaft end and the journal and having a sealing gap formed therebetween, a co-rotating sealing-liquid reservoir connected to the liquid seal, and magnetic field means for holding magnetic sealing liquid in the sealing gap. The magnetic sealing liquid held in the sealing gap by the magnetic field ensures reliable sealing of the high-vacuum space against the ambient atmosphere, and small losses of the sealing-liquid due to evaporation are compensated from the sealing liquid reservoir. Due to the fact that the high-vacuum seal is constructed as a contactless liquid seal, the high static and dynamic stresses have no effect on the operational reliability of the seal.

Contactless liquid seals in which the magnetic sealing-liquid thereof is held in the sealing gap by a magnetic field are already known as shaft seals. However, in such shaft seals, also known as ferro-fluidic seals, it is the sealing gap between a stationary housing and a rotating shaft that is sealed, i.e. the compensation of the sealing-liquid losses presents no difficulties of any kind. In contrast thereto, in the generator rotor according to the invention, the sealing gap is disposed between the hollow shaft end and the journal, i.e. between two parts moving at the same frequency of rotation. An application of the known ferro-fluidic seal as a high vacuum seal of a generator rotor is therefore only possible if a co-rotating sealing-liquid reservoir is provided as a further measure according to the invention.

In accordance with another feature of the invention, the sealing-liquid reservoir is at least partially disposed radially inward of the sealing gap, i.e. it is at a smaller diameter than the sealing gap, at least at certain regions. Through this construction measure, additional space that is subjected to the pumping effect due to rotation is obtained for the sealing liquid reservoir.

In accordance with an added feature of the invention, the sealing-liquid reservoir has a radially inner boundary being disposed at a radial distance from the sealing gap for adjusting input pressure of sealing-liquid in the sealing gap between predetermined limits in operation, i.e. it is done so that the input pressure of the sealing liquid in the sealing gap does not exceed or fall below predetermined limits in operation. The limits of the input pressure can then be determined in such a way that, on one hand the requirement of replenishing is met, and on the other hand the safety margin against a seal break-through into the high-vacuum space is not diminished, or only inappreciably so.

In accordance with an additional feature of the invention, the sealing-liquid reservoir, which is disposed inward of the gap, has a volume sufficient for compensating all sealing-liquid losses within a predetermined implantation interval. Thus, the automatic pumping action due to rotation can be utilized during the entire operating time.

In accordance with again another feature of the invention, the liquid seal has adjoining axially and radially directed canals formed therein connecting the sealing-liquid reservoir to the sealing gap. In this manner, the connection between the sealing gap and the sealing-liquid reservoir can be provided in a centrifugal-force-proof way and with little structural expense.

In accordance with again a further feature of the invention, there are provided radially directed partitions subdividing the sealing-liquid reservoir into a plurality of chambers. The partitions act in this embodiment as carriers for the sealing liquid and thereby prevent slippage between the sealing liquid and the wall of the sealing liquid reservoir.

In accordance with a concomitant feature of the invention, there is provided at least one filling canal leading from outside the rotor to the sealing-liquid reservoir, the filling canal being accessible and closeable from outside the rotor. Through this measure, the sealing-liquid reservoir can be replenished particularly simply if it is so indicated by an inspection.

Other features are considered as characteristic for the invention are set forth in the appended claims.

Although the invention is illustrated and described herein as embodied in a generator rotor, especially turbo-generator rotor with superconducting field winding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
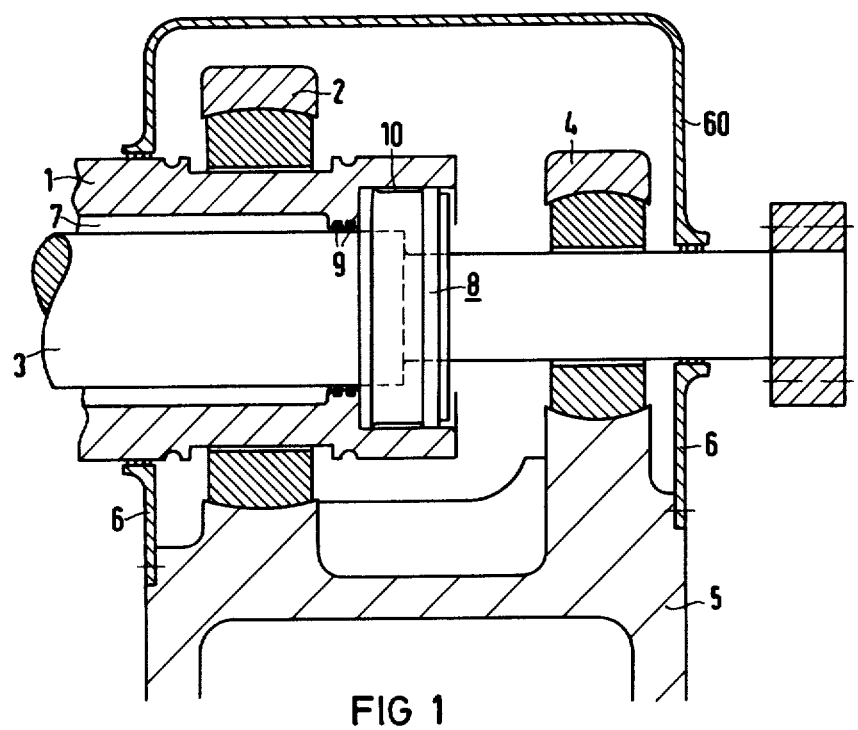
FIG. 1 is a fragmentary, diagrammatic longitudinal-sectional view of a turbo-generator rotor having two concentric rotor parts, in the vicinity of the bearing on the non-drive side.

Referring now to the figures of the drawing, and first particularly to FIG. 1 thereof, it is seen that a turbo-generator rotor with a superconducting field winding and two concentric rotor parts which enclose a high-vacuum space are supported on the non-drive side. The support is furnished by means of a hollow shaft end 1 of the outer rotor part in a first bearing 2, and by means of a journal 3 of the inner rotor part brought through the hollow shaft end 1 and supported in a second bearing 4. The two separate bearings 2, 4 in the embodiment example shown are disposed in a common bearing block 5 and are accessible from the outside after the upper part 60 of a multipart bearing housing 6 is removed. Between the inner circumference or periphery of the hollow shaft end 1 and the outer circumference or periphery of the journal 3, there is provided an annular space 7 which is directly connected to the high-vacuum space of the turbo-generator rotor and is sealed-off from the ambient atmosphere by a high-vacuum seal, designated as a whole with reference numeral 8. In order to ensure that no foreign seal 8 is disassembled, further sealing rings 9 are additionally disposed between the hollow shaft end 1 and the journal 3. These sealing rings therefore merely serve as a rough seal, i.e. they are not suited for taking over the purpose of the high-vacuum seal 8.

Figure 2:
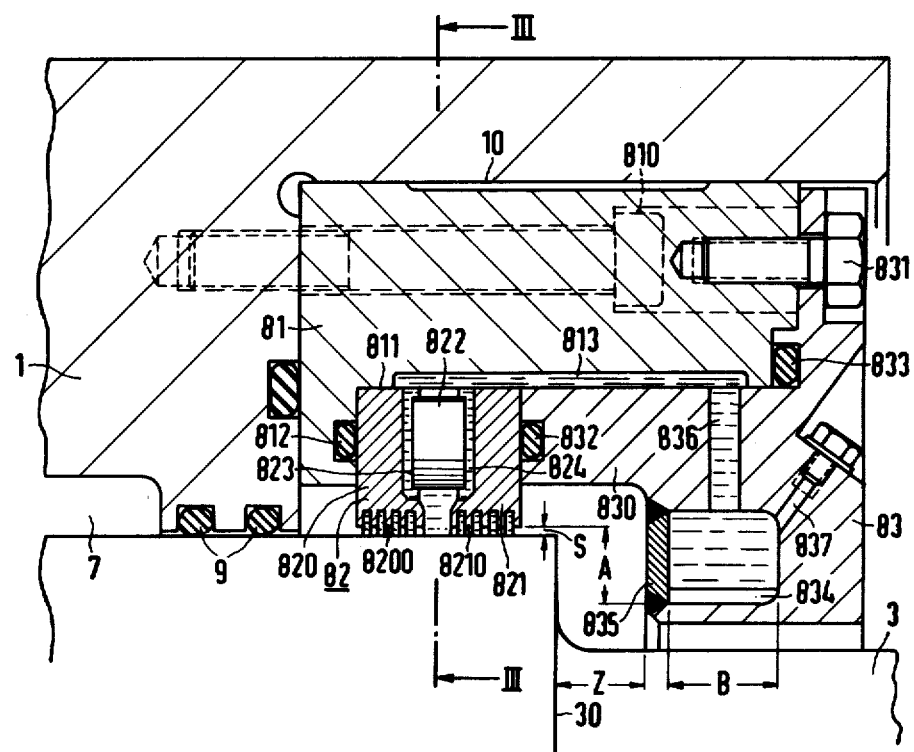
FIG. 2 is a detailed fragmentary view of the high-vacuum seal according to FIG. 1 in the vicinity of the bearings.
Figure 3:
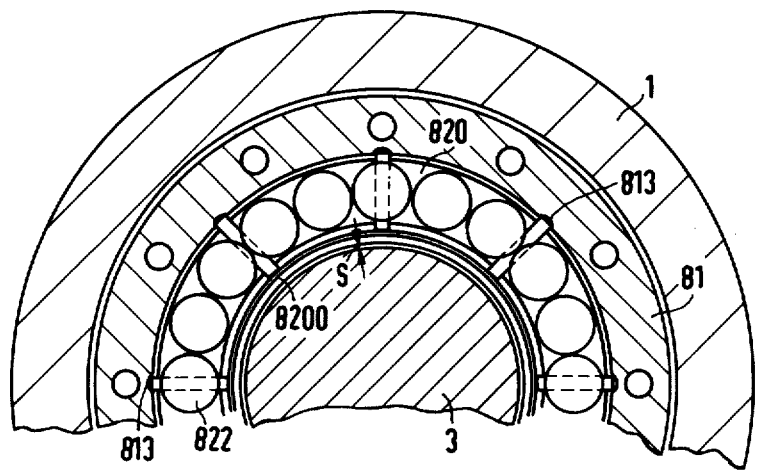
FIG. 3 is a fragmentary cross-sectional view of the high-vacuum seal taken along the line III—III in FIG. 2, in the direction of the arrows.

For a further explanation of the construction and operation of the high-vacuum seal 8, reference is made to FIGS. 2 and 3. To accommodate the seal housing 81 of the high-vacuum seal 8, a cut 10 is provided at the free end of the hollow shaft end 1, the sealing housing 81 being inserted with a play-free fit into this cut 10 and being held by means of several axial screws 810, which are distributed over the circumference thereof. To accommodate the sealing module 82 proper, the seal housing 81 is provided with a cut 811. The sealing module 82 is secured in the axial direction by the shoulder 830 of a head cover 83 projecting into the recess 811. The head cover 83 is fastened to the seal housing 81 by means of several screws 831 distributed over the circumference thereof. A sealing ring 812 is provided between the end faces of the cut 811 facing each other and the sealing module 82, a sealing ring 832 is provided between the end faces of the shoulder 830 facing each other and the sealing module 82, and a sealing ring 833 is disposed between the contact surfaces of the head cover 83 and the seal housing 81.

In addition to axially securing the sealing module 82, the head cover 83 has the further purpose of receiving a sealing-liquid reservoir 834. This sealing-liquid reservoir 834, which surrounds a smaller diameter step 30 of the journal 3 in ring-fashion, is machined as a concentric recess into the head cover 83 and is sealed liquid-tight by means of a welded-in face plate 835. The sealing liquid reservoir 834 is connected to the sealing module 82 by several radially-directed canals 836 which are formed in the head cover 83 and which are followed by axial-directed canals 813 that are cut as slots into the inner periphery of the housing 81 at the circular cut 811. A filling canal 837 which is accessible from the outside and can be closed off in a liquid-tight manner by means of a threaded plug 838, also leads into the sealing liquid reservoir.

The sealing module 82 includes pole pieces 820 and 821, which surrounds the journal 3 in ring-fashion and are provided at their inside circumference or periphery with sealing combs 8200 and 8210, respectively. These sealing combs 8200 and 8210 form a sealing gap designated with reference character S toward the journal 3. The gap is dimensioned in such a way that no metallic contact occurs. Between the two pole pieces 820 and 821 there are disposed disc-shaped permanent magnets 822, which are uniformly distributed over the circumference and are also aligned in the same manner with respect to their polarity. The connection between the axial canals 813 and the sealing gap S is accomplished through radially-directed canals 823 and 824 which are cut into the pole pieces 820 and 821 and lead together into the sealing gap S between the two pole pieces 820 and 821.

Before the turbo-generator is set in operation, the sealing-liquid reservoir 834 is filled up through the filling canal 837 with a magnetic sealing liquid. Such magnetic sealing liquids are colloidal suspensions of magnetic particles in a carrier liquid. In view of the high vacuum that is to be sealed, liquids with a low vapor pressure, such as with a diester base, are especially suitable as the carrier liquid. Due to the radial distance between the inner boundary of the sealing liquid reservoir 834 and the inner circumference of the sealing combs 8200 and 8210, which is designated with reference character A, the magnetic sealing liquid is automatically pumped into the sealing gap S by the action of centrifugal force. Because of the magnetic field built up by the permanent magnets 822 and the focusing action of the tips of the sealing combs 8200 and 8210, the magnetic sealing liquid is then held in the sealing gap S, so that the annular space 7, which is in communication with the high-vacuum space, is reliably sealed from the ambient atmosphere. Since no friction losses occur due to rotation in the sealing gap S, the losses of sealing liquid are extremely small. The sealing liquid losses caused by evaporation and by wetting the journal 3 in the case of axial motion, are compensated by replenishment from the radially lower-situated sealing liquid reservoir 834. The already-mentioned radial distance A is chosen in such a way that on one hand the requirement of replenishing the sealing liquid is met, and on the other hand, the safety margin against a seal-breakthrough into the high-vacuum space is not appreciably reduced. The volume determined by the radial distance A and the axial width B of the sealing liquid reservoir 834 and the diameter of the step 30 of the journal 3, is chosen in such a way that all sealing liquid losses can be compensated within a given inspection interval. In the mechanical construction of the high-vacuum seal 8, attention should be further paid to the fact that the axial distance between the step 30 of the journal 3 and end face plate 835 of the sealing liquid reservoir 834 designated with reference character Z, must be made larger than the axial displacement due to thermal dilatation.

There is claimed:

1. Generator rotor, comprising an inner and an outer concentric rotor part having a non-drive side and enclosing a high-vacuum space, a first and a second bearing disposed on said non-drive side, a hollow shaft end of said outer rotor part being supported in said first bearing, a journal of said inner rotor part being extended through said hollow shaft end and separately supported in said second bearing, a high-vacuum contactless liquid seal disposed between said hollow shaft end and said journal and having a sealing gap formed therebetween, a co-rotating sealing-liquid reservoir connected to said liquid seal, and magnetic field means for holding magnetic sealing liquid in said sealing gap.

2. Generator rotor according to claim 1, wherein said sealing-liquid reservoir is at least partially disposed radially inward of said sealing gap.

3. Generator rotor according to claim 1 or 2, wherein said journal has a smaller diameter step integral therewith in the vicinity of said sealing-liquid reservoir, said step being surrounded by said sealing-liquid reservoir in ring fashion leaving a space therebetween.

4. Generator rotor according to claim 2, wherein said sealing-liquid reservoir has a radially inner boundary being disposed at a radial distance from said sealing gap for adjusting input pressure of sealing-liquid in said sealing gap between predetermined limits in operation.

5. Generator rotor according to claim 2, wherein said sealing-liquid reservoir has a volume sufficient for compensating all sealing-liquid losses within a predetermined inspection interval.

6. Generator rotor according to claim 1, wherein said liquid seal has adjoining axially and radially directed canals formed therein connecting said sealing-liquid reservoir to said sealing gap.

7. Generator rotor according to claim 1, including radially directed partitions subdividing said sealing-liquid reservoir into a plurality of chambers.

8. Generator rotor according to claim 1, including at least one filling canal leading from outside the rotor of said sealing-liquid reservoir, said filling canal being accessible and closeable from outside the rotor.

* * * * *